(12) United States Patent
Eyole et al.

(10) Patent No.: US 12,481,606 B2
(45) Date of Patent: Nov. 25, 2025

(54) DATA PROCESSING APPARATUS AND METHOD FOR HANDLING STALLED DATA

(71) Applicant: Arm Limited, Cambridge (GB)

(72) Inventors: Mbou Eyole, Soham (GB); Giacomo Gabrielli, Cambridge (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 18/574,277

(22) PCT Filed: Jun. 21, 2022

(86) PCT No.: PCT/GB2022/051577
§ 371 (c)(1),
(2) Date: Dec. 26, 2023

(87) PCT Pub. No.: WO2023/275514
PCT Pub. Date: Jan. 5, 2023

(65) Prior Publication Data
US 2024/0296132 A1    Sep. 5, 2024

(30) Foreign Application Priority Data

Jul. 1, 2021   (GB) .................................... 2109518

(51) Int. Cl.
*G06F 13/16*    (2006.01)
*G06F 13/26*    (2006.01)
(52) U.S. Cl.
CPC ........ *G06F 13/1673* (2013.01); *G06F 13/161* (2013.01); *G06F 13/26* (2013.01)
(58) Field of Classification Search
None
See application file for complete search history.

(56) References Cited

U.S. PATENT DOCUMENTS

| 6,192,465 B1 | 2/2001 | Roberts |
| 2018/0052690 A1 | 2/2018 | Tran |
| 2023/0164630 A1* | 5/2023 | Lin ...................... H04L 45/306 370/329 |

FOREIGN PATENT DOCUMENTS

| EP | 3719654 A1 | 10/2020 |
| WO | 0042501 A1 | 7/2000 |

OTHER PUBLICATIONS

Combined Search and Examination Report for GB2109518.7, dated Mar. 29, 2022.

(Continued)

*Primary Examiner* — Charles J Choi
(74) *Attorney, Agent, or Firm* — NIXON & VANDERHYE P.C.

(57) ABSTRACT

There is provided a data processing apparatus and method. The data processing apparatus comprises a plurality of processing elements connected via a network arranged on a single chip to form a spatial architecture. Each processing element comprising processing circuitry to perform processing operations and memory control circuitry to perform data transfer operations and to issue data transfer requests for requested data to the network. The memory control circuitry is configured to monitor the network to retrieve the requested data from the network. Each processing element is further provided with local storage circuitry comprising a plurality of local storage sectors to store data associated with the processing operations, and auxiliary memory control circuitry to monitor the network to detect stalled data (S60). The auxiliary memory control circuitry is configured to transfer the stalled data from the network to an auxiliary storage buffer (S66) dynamically selected from amongst the plurality of local storage sectors (S64).

20 Claims, 9 Drawing Sheets

(56) References Cited

OTHER PUBLICATIONS

Figure 1:
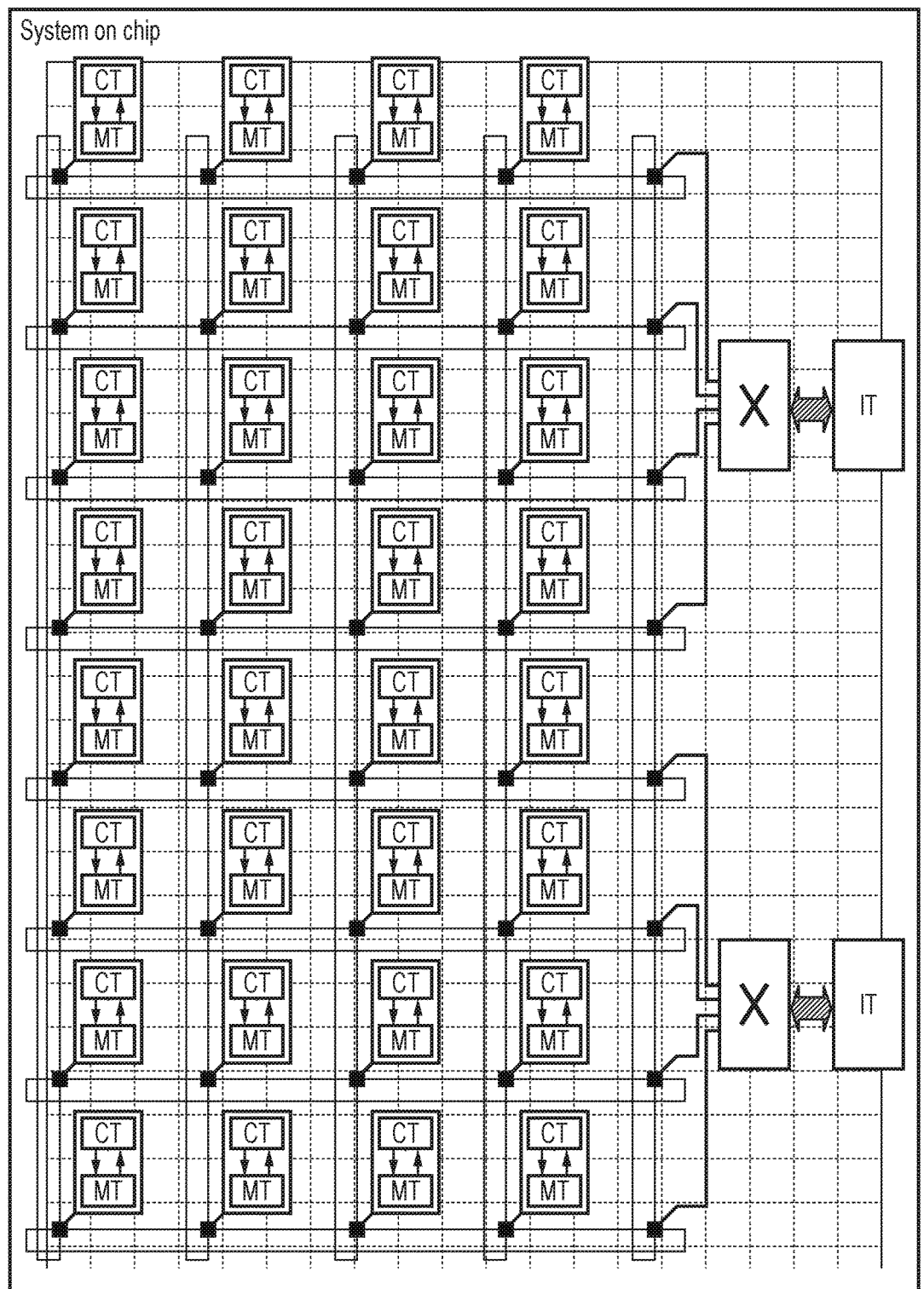

International Search report for International Application No. PCT/GB2022/051577, dated Sep. 12, 2022.
Parashar et al., "Efficient Spatial Processing Element Control Via Triggered Instructions," Published by the IEEE Computer Society, Jan. 6, 2021, p. 120-137.
Office Action for EP Application No. 22734667.3 dated Feb. 5, 2025, 8 pages.

* cited by examiner

DATA PROCESSING APPARATUS AND METHOD FOR HANDLING STALLED DATA

Some data processing apparatuses are provided with a plurality of processing elements arranged to form a spatial architecture with each of the processing elements connected via a network. The processing elements perform processing operations and data transfer operations including issuing data transfer requests to request data from the network. Typically, the processing elements of the spatial architecture are arranged to monitor data on the network to identify the requested data and to retrieve it from the network when it is detected. However, if requested data items for a processing element are returned in an order that is different from the order that is expected by the data processing element then the returned data can stall with the required data stuck behind other requested data. This stalled data can cause the spatial architecture to stall.

According to some example configurations there is provided a data processing apparatus comprising a plurality of processing elements connected via a network arranged on a single chip to form a spatial architecture, each processing element of the plurality of processing elements comprising:
  processing circuitry to perform processing operations;
  memory control circuitry to perform data transfer operations associated with the processing element and to issue data transfer requests for requested data to the network, wherein the memory control circuitry is configured to monitor the network for the requested data and, in response to detecting the requested data, to retrieve the requested data from the network;
  local storage circuitry to store data associated with the processing operations, the local storage circuitry comprising a plurality of local storage sectors; and
  auxiliary memory control circuitry configured to monitor the network to detect stalled data associated with the processing element and, in response to detecting the stalled data, to transfer the stalled data from the network to an auxiliary storage buffer dynamically selected from amongst the plurality of local storage sectors.

According to further example configurations there is provided a method of operating a data processing apparatus comprising a plurality of processing elements connected via a network arranged on a single chip to form a spatial architecture, each processing element comprising processing circuitry, memory control circuitry, local storage circuitry comprising a plurality of local storage sectors and auxiliary memory control circuitry, the method comprising:
  performing processing operations using the processing circuitry;
  storing data associated with the processing operations;
  with the memory control circuitry, performing data transfer operations associated with the processing element, issuing data transfer requests for requested data to the network, monitoring the network for the requested data and, in response to detecting the requested data in one of the plurality of interface channels, retrieving the requested data from the network; and
  with the auxiliary memory control circuitry monitoring the network to detect stalled data associated with the processing element and, in response to detecting the stalled data, transferring the stalled data from the network to an auxiliary storage buffer dynamically selected from amongst the plurality of local storage sectors based on a usage metric of each of the local storage sectors by the memory control circuitry.

Figure 2:
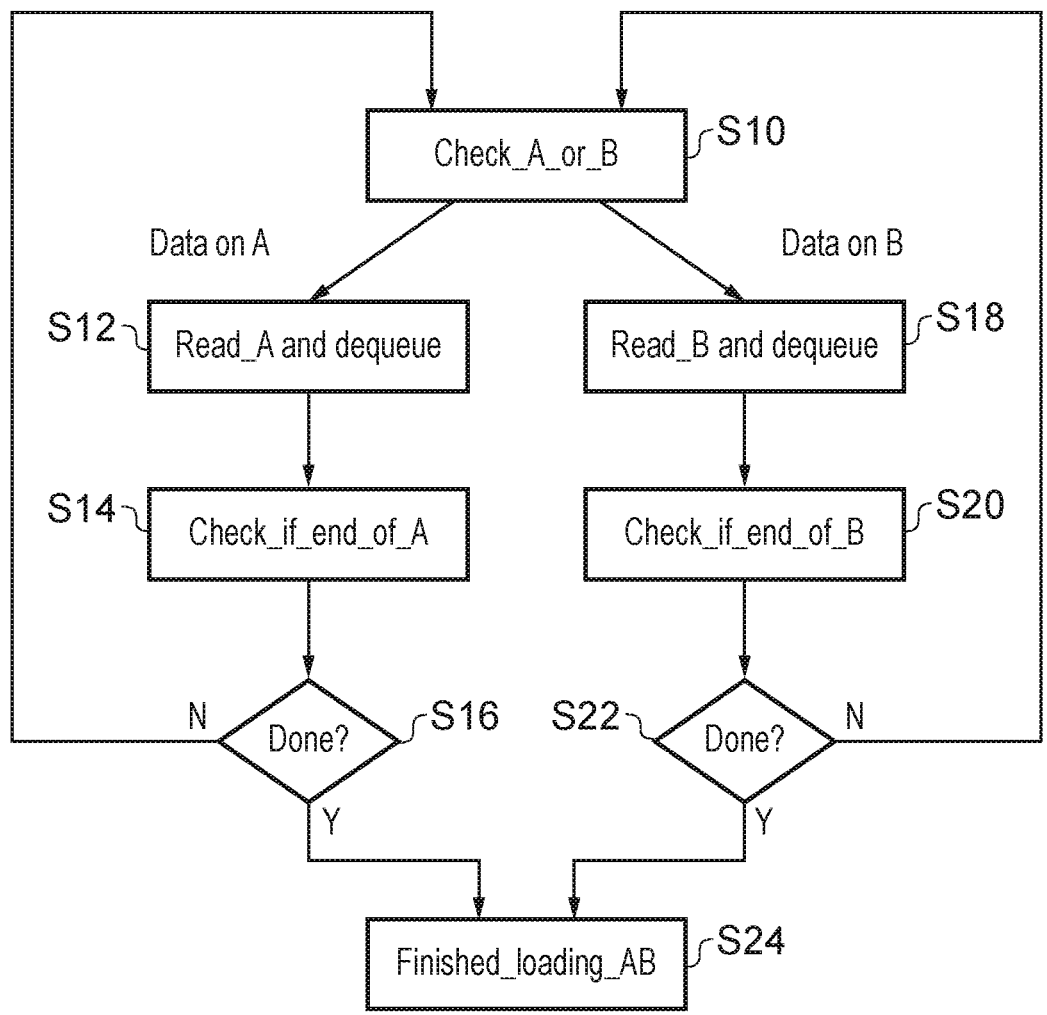
Figure 3:
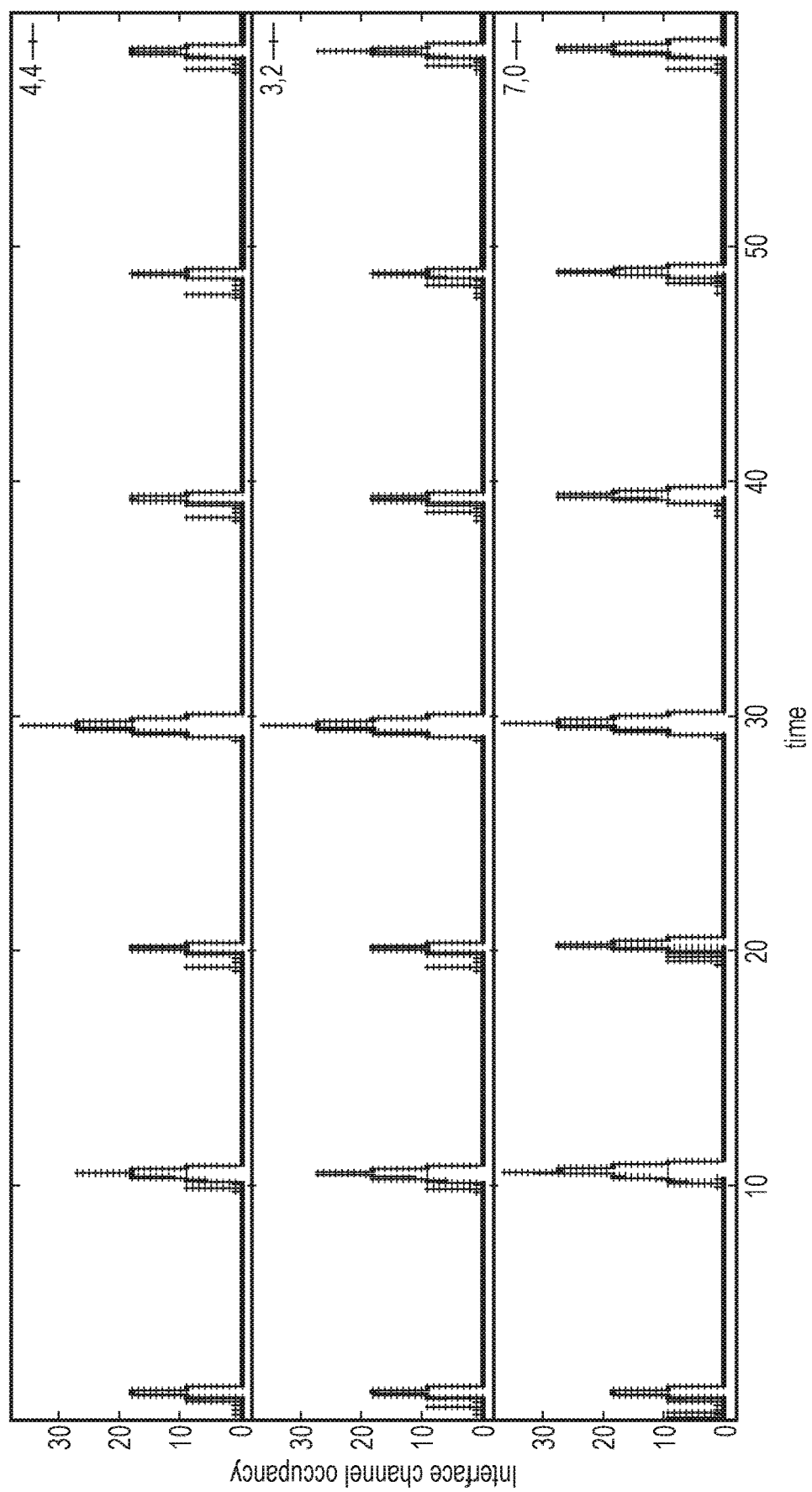
Figure 4:
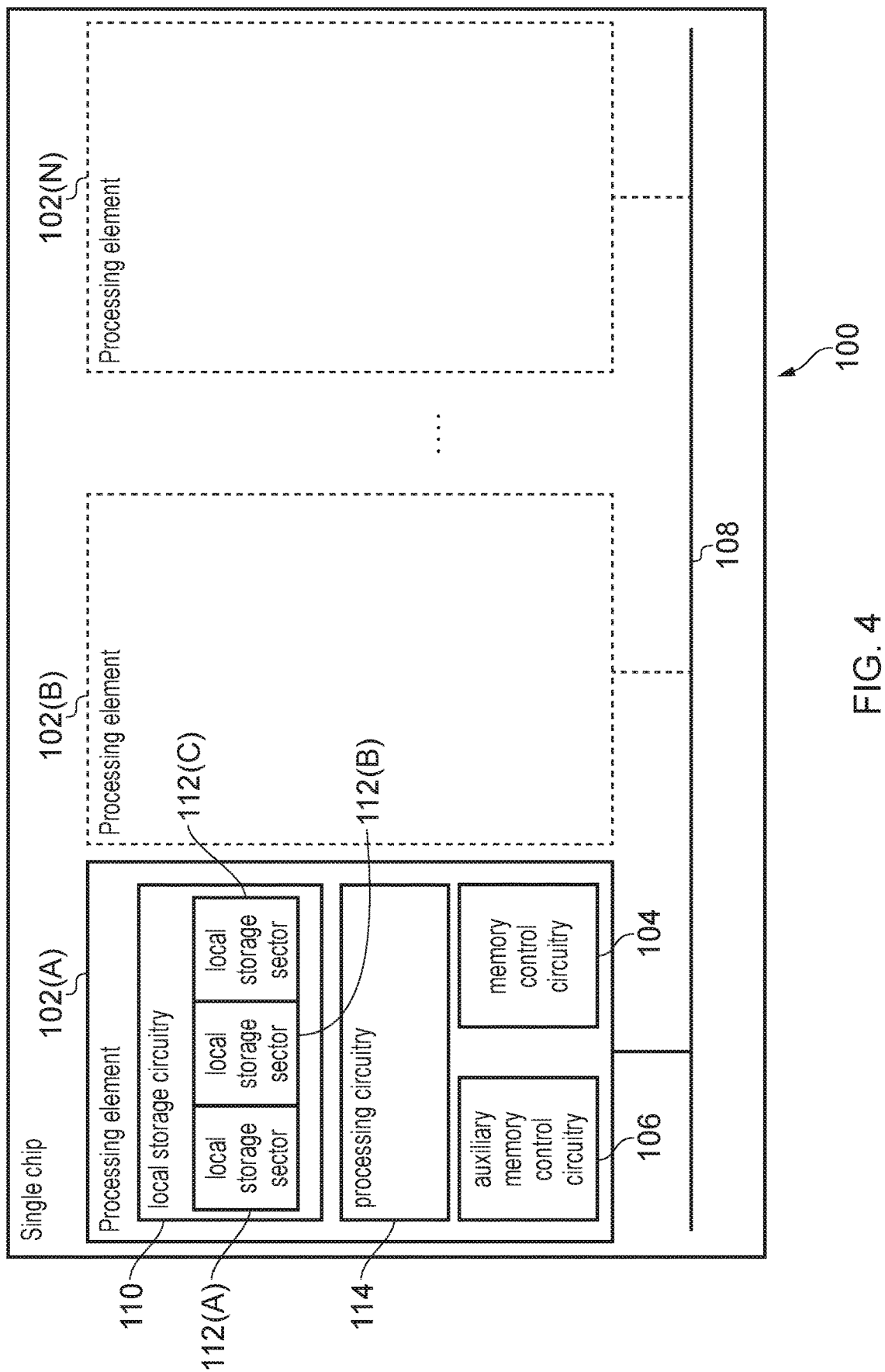
Figure 5:
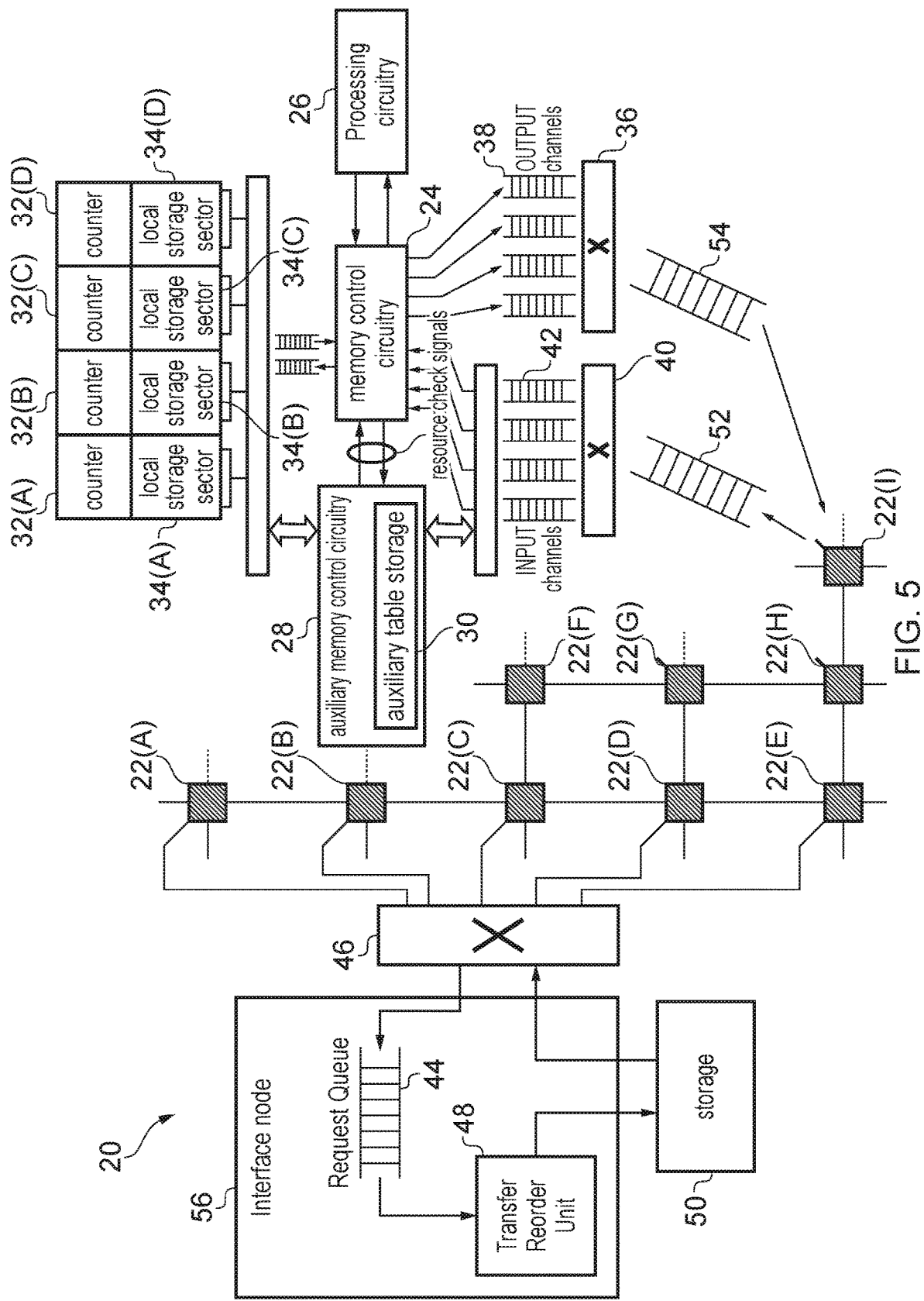
Figure 6:
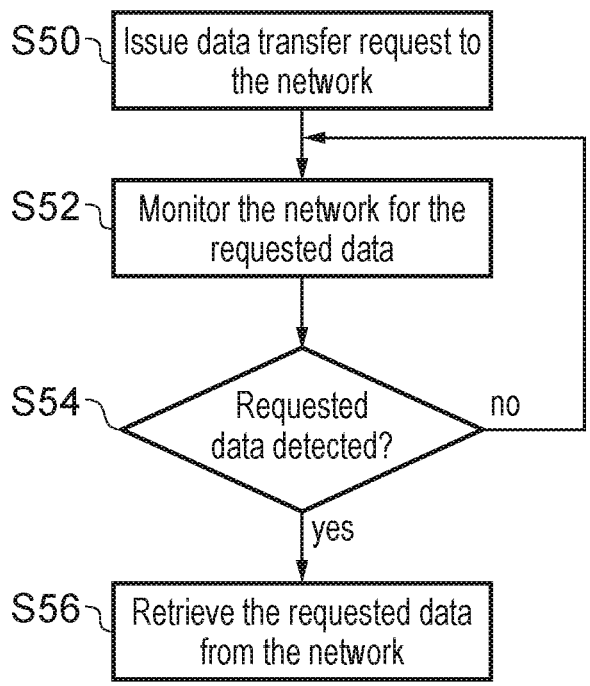
Figure 7:
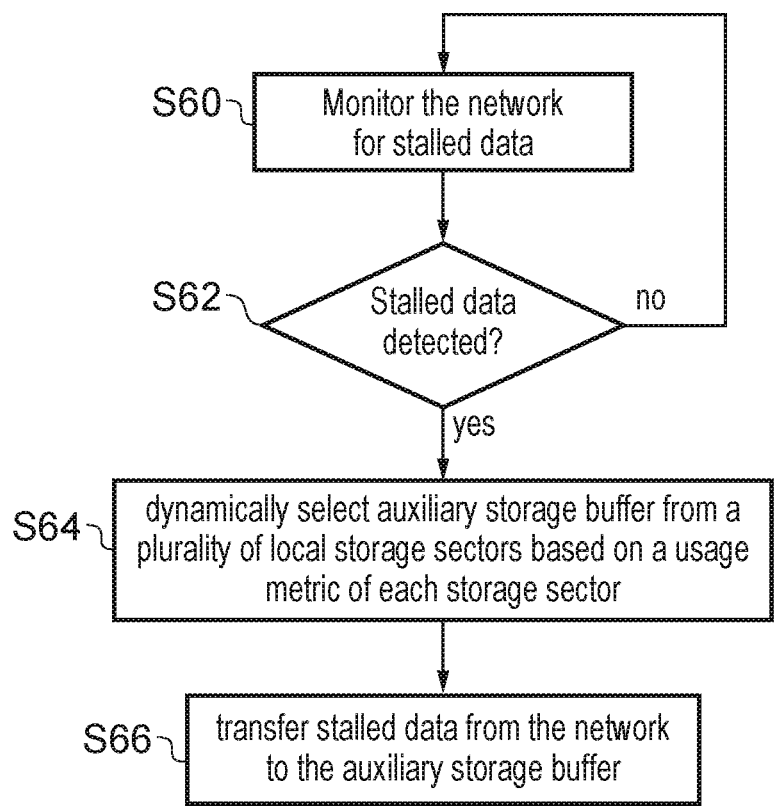
Figure 8:
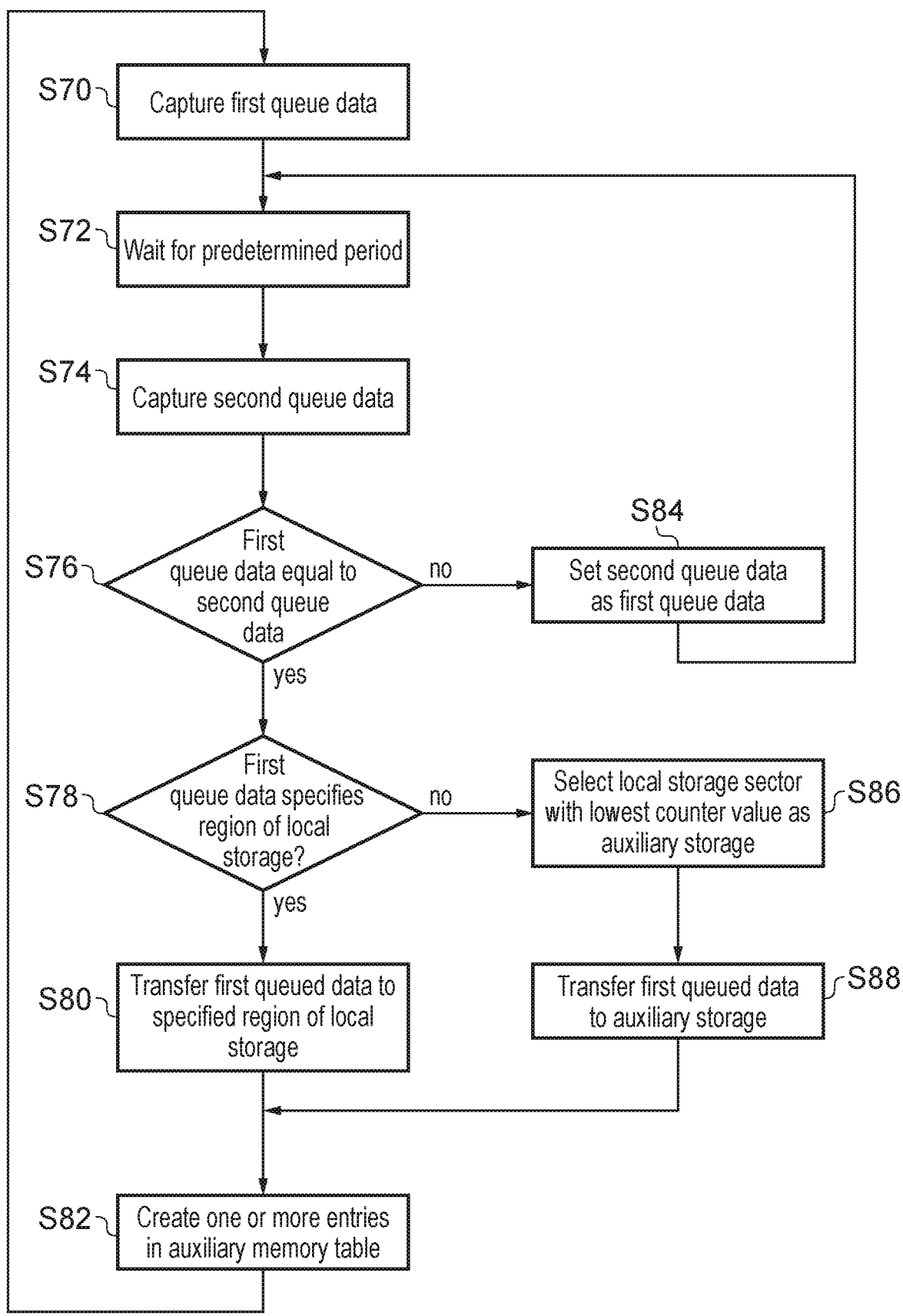
Figure 9:
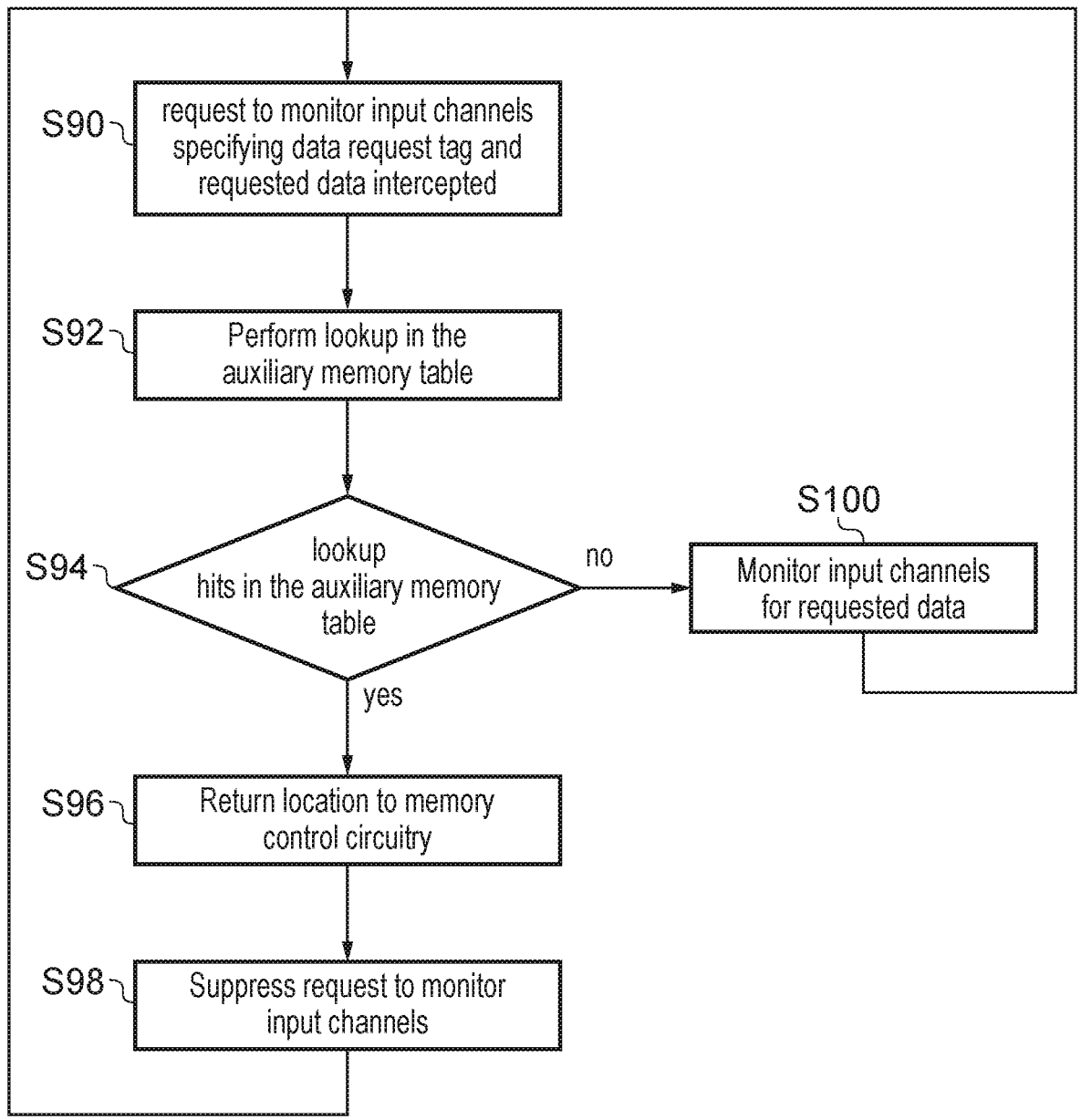
Figure 10:
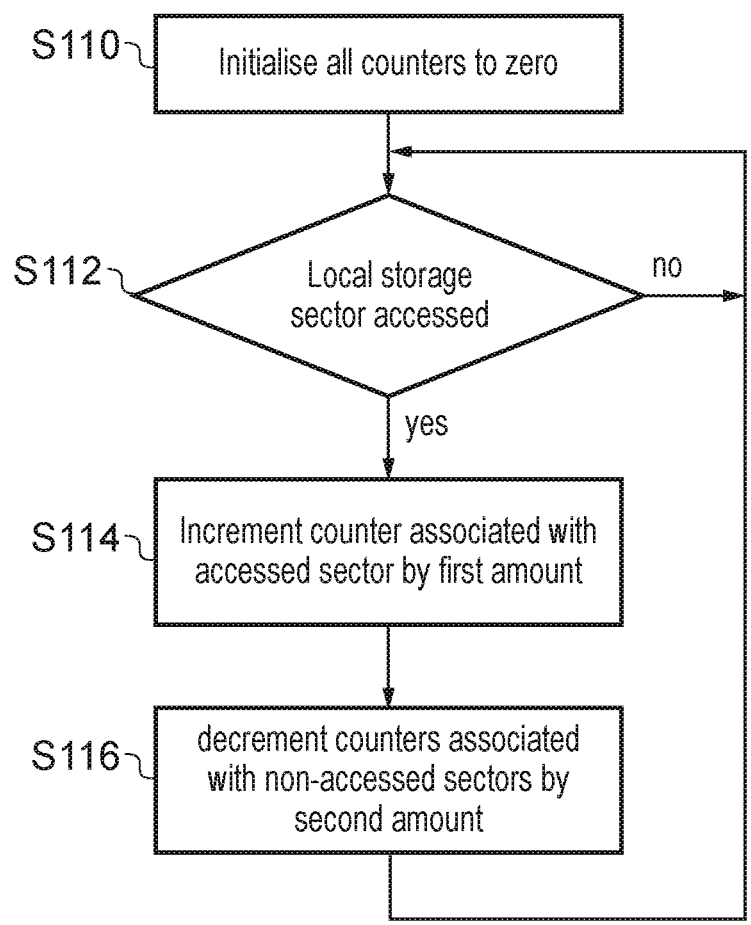

The present techniques will be described further, by way of example only, with reference to embodiments thereof as illustrated in the accompanying drawings, in which:
  FIG. 1 schematically illustrates a data processing apparatus arranged as a spatial architecture according to various examples of the present techniques;
  FIG. 2 schematically illustrates an alternative method for detecting stalls in a data processing apparatus according to various examples of the present techniques;
  FIG. 3 schematically illustrates a frequency of data requests typically observed in a data processing apparatus according to various examples of the present techniques;
  FIG. 4 schematically illustrates details of a processing element according to various examples of the present techniques;
  FIG. 5 schematically illustrates details of a processing element according to various examples of the present techniques;
  FIG. 6 schematically illustrates a sequence of steps taken by memory control circuitry according to various examples of the present techniques;
  FIG. 7 schematically illustrates a sequence of steps taken by auxiliary memory control circuitry according to various examples of the present techniques;
  FIG. 8 schematically illustrates a sequence of steps taken by auxiliary memory control circuitry in order to detect stalled data according to various examples of the present techniques;
  FIG. 9 schematically illustrates a sequence of steps taken by auxiliary memory control circuitry in response to a data transfer request according to various examples of the present techniques; and
  FIG. 10 schematically illustrates a sequence of steps taken by local storage circuitry according to various examples of the present techniques.

In some example configurations there is provided a data processing apparatus comprising a plurality of processing elements connected via a network arranged on a single chip to form a spatial architecture. Each processing element of the plurality of processing elements comprises processing circuitry to perform processing operations and memory control circuitry to perform data transfer operations associated with the processing element. The memory control circuitry is arranged to issue data transfer requests for requested data to the network and is configured to monitor the network for the requested data. The memory control circuitry is configured to retrieve the requested data from the network in response to detecting the requested data. Each processing element of the data processing apparatus is also provided with local storage circuitry to store data associated with the processing operations, the local storage circuitry comprising a plurality of local storage sectors, and auxiliary memory control circuitry configured to monitor the network to detect stalled data associated with the processing element. The auxiliary memory control circuitry is configured to transfer the stalled data from the network to an auxiliary storage buffer in response to detecting the stalled data where the auxiliary storage buffer is dynamically selected from amongst the plurality of local storage sectors.

Spatial architectures are an arrangement of data processing elements that are distributed in space allowing a number of computations to be executed in parallel rather than sequentially. Typical spatial architectures enable different instructions to be applied in parallel to different data or the same instruction to be applied to different data during a same instruction cycle. The processing elements of the spatial architecture comprise memory control circuitry and processing circuitry which can be provided as physically distinct circuits that communicate with one another or as a single block of circuitry that performs the functions of both the memory control circuitry and the processing circuitry. The memory control circuitry is arranged to issue data transfer requests which can be in response to instructions decoded by the memory control circuitry or the processing circuitry. Furthermore, the memory control circuitry monitors the network either periodically with a varying, random or fixed period, or continuously to detect the requested data being returned on the network. Each processing element is also provided with local storage circuitry to store data associated with the processing operations. The local storage circuitry is divided into a number of sectors. In some configurations the local storage circuitry is unique to each processing element, and in other example configurations the local storage circuitry is shared between a number of adjacent processing elements. The memory control circuitry is responsive to detecting the requested data to retrieve the requested data from the network for storage in the local storage circuitry or for processing by the processing circuitry.

The inventors of the present techniques have realised that, where the data requested by a processing element may be returned out of order (with respect to the order in which it is requested), the required data can become stuck (stalled) behind data that has been requested but is not yet required. As a result the processing element, and potentially the entire spatial architecture, can stall. Hence, the data processing apparatus is provided with auxiliary memory control circuitry. The auxiliary memory control circuitry may be provided as a discrete block of circuitry for each processing element that interfaces with the processing circuitry and memory control circuitry. Alternatively, the auxiliary memory control circuitry can be provided as part of a common memory control circuitry block or as part of any of the other circuitry that forms the processing element. The auxiliary memory control circuitry monitors data on the network to determine if the data has stalled. The auxiliary memory control is configured to, in response to detecting stalled data, transfer (retrieve) the stalled data from the network and to store the stalled data in one of the sectors of the local storage circuitry. Thus, the auxiliary memory control circuitry repurposes a portion of the local storage circuitry to relieve pressure on the network and to reduce the probability of a network stall.

The particular architecture associated with the processing elements can be variously defined. In some example configurations the processing elements comprise processing pipelines configured to respond to a sequence of instructions in program counter order. In some other example configurations the processing operations and the data transfer operations are triggered operations; each triggered operation is performed in response to trigger data meeting a corresponding processing trigger condition, and the processing element is configured to set further trigger data in response to completion of the triggered operation. In contrast to processing elements configured to respond to a sequence of instructions in program counter order, each instruction executed by the processing element (processing circuitry or the memory control circuitry) is a triggered operation that has a set of trigger conditions. The triggered operation will only be issued (sent for execution by the respective processing circuitry or memory control circuitry) when those trigger conditions are valid. The trigger condition can depend on any prescribed state of the processing element (for example a state of a trigger predicate, memory occupancy, or an operating context). Once the triggered operation is complete, the processing element (processing circuitry or the memory control circuitry) can set further trigger data by setting one or more trigger conditions (for example, setting bits of the trigger predicate) which can subsequently be used to determine whether other instructions are ready for execution. In some triggered architecture configurations no explicit program counter is provided and no dedicated branch instructions are defined. Providing triggered processing elements as part of the spatial architecture results in simplified processing circuitry and avoids the need for complex branch prediction mechanisms.

The transfer of data between the network and the processing element can be managed in a number of different ways. In some example configurations each data transfer request specifies a data request tag; and the auxiliary memory control circuitry comprises auxiliary table storage to store an auxiliary memory table associating a corresponding data request tag of the stalled data and a corresponding location in the auxiliary storage buffer. The auxiliary table storage can be dedicated storage associated with the auxiliary memory control circuitry or can be part of the local storage circuitry. For configurations in which the auxiliary storage circuitry is part of the local storage circuitry, the auxiliary memory control circuitry comprises a register or other storage element indicative of a location in the local storage circuitry that is used as the auxiliary table storage. The auxiliary storage table can be arranged as a set associative cache, a fully associative cache, or a direct mapped cache or any other memory configuration known to the person skilled in the art. In some alternative example configurations the memory control circuitry performs an initial check, specifying the data request tag, in the local storage circuitry to determine if the required data has already been retrieved from the network by the auxiliary memory circuitry.

For example configurations in which the auxiliary memory table is provided, the auxiliary memory control circuitry is configured to perform, in response to an indication that the memory control circuitry requires the stalled data, a lookup in the auxiliary memory table based on the data request tag specified by the data transfer request. The lookup in the auxiliary memory table is performed based on the data request tag or a hash of the data request tag.

In some example configurations the auxiliary memory control circuitry is configured to, when the lookup hits in the auxiliary memory table, provide a location associated with the data request tag to the memory control circuitry; and the memory control circuitry is configured to retrieve the stalled data from the location. The auxiliary memory circuitry is configured to return a location in the auxiliary storage buffer associated with a data request tag. In particular, the auxiliary memory circuitry takes, as an input, the data request tag, and returns the location in the auxiliary storage buffer. In some example configurations, when the lookup misses in the auxiliary memory table, the auxiliary memory control circuitry provides, to the memory control circuitry, an indication that the data is not present in the auxiliary storage buffer. The memory control circuitry is responsive to the indication from the auxiliary memory control circuitry to monitor the network for the requested data. In some example configurations the lookup in the auxiliary memory table is performed before the memory control circuitry begins monitoring the network. In alternative configurations the auxiliary memory control circuitry performs the lookup in parallel with the memory control circuitry monitoring the network for the requested data.

The auxiliary storage buffer is one or more of the plurality of local storage sectors provided by the local storage circuitry. The particular sector that is repurposed (used) for the auxiliary storage buffer can be selected in a variety of different ways. For example, the auxiliary storage buffer may be located in a local storage sector that is statically selected or that is varied randomly during operation of the processing circuitry. In some example configurations the auxiliary memory control circuitry is configured to select the auxiliary storage buffer dynamically from amongst the plurality of local storage sectors based on a usage metric of each of the local storage sectors by the memory control circuitry. In this way the local storage sector that is used for the auxiliary storage circuitry is the local storage sector that is least likely to cause a conflict due to coincidental accesses by the memory control circuitry and the auxiliary memory control circuitry.

In some example configurations, for which the local storage sector is based on the usage metric, each processing element further comprises a plurality of counters defining the usage metric, each counter indicative of a number of times an associated local storage sector has been accessed by the memory control circuitry; and the auxiliary memory control circuitry is configured to select, as the auxiliary storage buffer, a particular local storage sector corresponding to a counter of the plurality of counters indicating fewest accesses. The operation of the plurality of counters can be defined in various ways. In some example configurations the auxiliary memory control circuitry periodically selects the local storage sector based on a current value of each of the plurality of counters. In particular, the auxiliary memory storage circuitry chooses the local storage sector associated with the counter that has a lowest counter value. Once the local storage sector has been selected the counters are reset. The memory control circuitry is configured to modify (increment) the counter associated with a local storage sector that it accesses. When the auxiliary memory control circuitry next selects, after a predetermined time has passed, the local storage sector to be used, the counters will indicate a number of accesses by the memory control circuitry over the predetermined time. In some alternative configurations the counters are saturating counters that saturate to a minimum value (e.g. zero) and that saturate to a maximum value (e.g. $2^N$ minus 1 for an N bit counter). In such configurations the memory control circuitry is configured to modify in a first direction (increment) the counter corresponding to a currently accessed local storage sector by a first amount and to modify in a second direction (decrement) each counter associated with a different sector (a local storage sector not currently being accessed). In this way a global picture of which local storage sectors are being accessed by the memory control circuitry can be used to determine the local storage sector to be used as the auxiliary storage buffer. The first amount and the second amount can take any value, in some example configurations the first amount and the second amount is a same amount, for example, one.

The local storage circuitry can be provided using a range of different circuit arrangements. In some example configurations the local storage is configured to allow the memory control circuitry and the auxiliary memory control circuitry to access different sectors in parallel. In example configurations in which parallel accesses are permitted the local storage circuitry is configured to, in response to parallel accesses to a same sector by the memory control circuitry and the auxiliary control circuitry, prioritise the auxiliary memory control circuitry. In other example configurations the auxiliary memory control circuitry is configured to only allow one access to the local memory storage circuitry at any given time. In such example configurations the local storage sector is configured to prioritise the auxiliary memory control circuitry. By prioritising the auxiliary memory control circuitry in response to an access conflict the processing elements are able to prioritise the removal of stalled data from the network.

The stalled data can be detected in different ways. In some example configurations the memory control circuitry is configured to, when retrieving the data from the network, modify a dequeue signal to indicate that the data has been removed from the network; and the auxiliary memory control circuitry is configured to, when monitoring the network to detect the stalled data: periodically monitor the dequeue signal; and determine that the queued data comprises stalled data when the dequeue signal indicates that the data remains on the network The dequeue signal is asserted (modified to indicate that data has been dequeued) by the memory control circuitry when it retrieves a value from the network. The auxiliary memory control circuitry monitors this dequeue signal periodically. If the dequeue signal indicates that data remains on the network (i.e., the dequeue signal is not asserted) then the auxiliary memory control circuitry determines that the queued data comprises stalled data (i.e., a stall condition has occurred) and takes action to transfer the stalled data from the network. The specified interval may be a specified interval of time, or a specified number of instruction cycles. Furthermore, the specified interval may be of fixed duration or varying duration (for example, random or pseudo random variation may be used). When the auxiliary memory control circuitry transfers data from the network it will modify the dequeue signal to indicate that the data has been retrieved from the network. In some example configurations, the auxiliary memory control circuitry will not assert the dequeue signal unless a stall condition occurs and the auxiliary memory control circuitry subsequently intercepts the data transfer and retrieves data from the network. In some example configurations the auxiliary memory control circuitry is configured to modify the dequeue signal to indicate that data remains on the network (i.e., there is data to be transferred from the network) when data to be retrieved is detected on the network and the dequeue signal indicates that data has been removed (i.e., the dequeue signal is clear). In some example configurations the memory control circuitry is configured to modify the dequeue signal to indicate that data remains on the network that the memory control circuitry is unable to retrieve (for example, due to a trigger condition not being asserted). In this way the auxiliary memory control circuitry is able to maintain a view of whether the memory control circuitry has retrieved data from the network (i.e., has set the dequeue signal) or whether there is stalled data on the network that requires intervention by the auxiliary memory control circuitry.

In some example configurations each processing element further comprises a plurality of interface channels to store queued data to be transferred between the processing element and the network; and the memory control circuitry is configured to monitor the network for the requested data by monitoring the plurality of interface channels. Data that has been requested by a processing element is returned, via the network, to the plurality interface channels. The plurality of interface channels provide temporary storage for data that has been returned on the network but that has not yet been retrieved by the processing element. In this way network throughput can be improved as there is no requirement to rapidly remove data from the network in order to free up space for subsequent data items required, for example, by a different processing element.

In some example configurations, for which the plurality of interface channels are provided, the auxiliary memory control circuitry is configured to, when monitoring the network to detect stalled data: capture first queue data indicative of the queued data in the plurality of interface channels at the start of a predetermined time period; capture second queue data indicative of the queued data in the plurality of interface channels at the end of the predetermined time period; and determine that the queued data comprises stalled data when the first queue data is the same as the second queue data. In some configurations the auxiliary memory control circuitry captures a plurality of sets of first queue data and second queue data and determines that a queued data in a particular interface channel of the plurality of interface channels comprises stalled data when a corresponding pair of the plurality of sets of first queue data and second queue data indicated that the data in particular interface channel has not changed over the predetermined time period. In this way the auxiliary memory circuitry can reduce the probability of a network stall whilst minimising a number of channels from which the auxiliary memory control circuitry retrieves data.

The plurality of interface channels can be arranged as any set of storage elements. However, in some example configurations each of the plurality of interface channels is a first-in-first-out buffer. This provides a low circuit area implementation.

The plurality of interface channels can be arranged to function as shared input and output channels. Alternatively, in some example configurations the plurality of interface channels comprise a plurality of input channels configured to receive data from the network and a plurality of output channels configured to buffer data output to the network. In this way the auxiliary memory control circuitry can be arranged to only monitor the input channels removing the requirement to monitor which data of the plurality of channels is retrieved data and which data is outgoing data.

The spatial architecture can be any layout of processing elements within a single chip. In this way the position of the processing elements can be tailored based on positions of storage structures and input/output structures of the single chip. In some example configurations the spatial architecture comprises the plurality of processing elements connected to form a multi-dimensional array. The number of dimensions associated with the array is not particularly defined and is not restricted by a number of dimensions associated with the physical placement of components on a chip. Rather, the multi-dimensional array is defined by a layout of connections between processing elements. In some example configurations the spatial architecture comprises processing elements connected in a two-dimensional array. In such configurations each processing element is connected in a topological equivalent of a sequence of rows and columns with processing element $P_{i,j}$ connected between elements $P_{i-1,j}$, $P_{i+1,j}$, $P_{i,j-1}$, and $P_{i,j+1}$.

In some example configurations the multi-dimensional array is connected to form a multi-dimensional torus layout. The multi-dimensional torus layout is achieved by arranging an array of size R by S such that processing element $P_{i,j}$ ($1 \leq i \leq R$; $1 \leq j \leq S$) are connected between elements $P_{i-1,j}$, $P_{i+1,j}$, $P_{i,j-1}$, and $P_{i,j+1}$; elements $P_{1,j}$ ($1<j<S$) are connected between elements $P_{R,j}$, $P_{2,j}$, $P_{1,j-1}$, and $P_{1,j+1}$; $P_{R,j}$ ($1<j<S$) are connected between elements $P_{R-1,j}$, $P_{1,j}$, $P_{R,j-1}$, and $P_{R,j+1}$; $P_{i,1}$ ($1<i<R$) are connected between elements $P_{i-1,1}$, $P_{i+1,1}$, $P_{i,S}$, and $P_{i,2}$; $P_{i,S}$ ($1<i<R$) are connected between elements $P_{i-1,S}$, $P_{i+1,S}$, $P_{i,S-1}$, and $P_{i,1}$; $P_{1,1}$ is connected to $P_{R,1}$, $P_{2,1}$, $P_{1,S}$, and $P_{1,2}$; $P_{1,S}$ is connected to $P_{R,S}$, $P_{2,S}$, $P_{1,S-1}$, and $P_{1,1}$; $P_{R,1}$ is connected to $P_{R-1,1}$, $P_{1,1}$, $P_{R,S}$, and $P_{R,2}$; and $P_{R,S}$ is connected to $P_{R-1,S}$, $P_{1,S}$, $P_{R,S-1}$, and $P_{R,1}$. The multi-dimensional torus layout provides the advantage that no processing elements are located on the edge of the array resulting in a more equal distribution of network bandwidth.

Each processing element is responsive to different types of data requests. In some example configurations the data transfer request is one of: an inter-processing element data transfer request specifying data to be transferred from another processing element; and a memory request specifying data to be transferred from a memory location in main memory. In some example configurations the data transfer request may request data to be transferred to main memory or to another processing element of the plurality of processing elements. Furthermore, in some example configurations the data transfer request specifies at least one of: the processing element making the data transfer request; a particular interface channel; whether a destination of the data elements is memory control circuitry or the processing circuitry; whether the data transfer request is a multi-cast data transfer request specifying a plurality of processing elements; and an amount of data to be transferred.

The plurality of processing elements may be connected via any of a plurality of paths within the network to global storage. However, in some example configurations the plurality of processing elements are connected to global storage via a common interface node. The interface node sequentially orders and arbitrates data requests from the plurality of processing elements and distributes returned data to the data processing elements. In some example configurations the data processing apparatus is configured to arrange processing elements of the plurality of processing elements into subgroups; and the data processing apparatus further comprises a multiplexer configured to route memory requests to the subgroup containing the processing element. This approach ensures that data requested by a processing element is provided at a location close to the processing element. In alternative configurations the multiplexer is configured to select a random subgroup to route the memory request to. This approach distributes memory accesses more evenly across the network.

In general the auxiliary memory control circuitry is configured to store stalled data in the auxiliary memory buffer based on the techniques described herein. In some example configurations the data transfer request specifies that the returned data is static data to be stored in a particular storage location. The particular storage location is a particular location within the local storage circuitry and provides the programmer with flexibility to ensure that particular data is stored at a location that may be advantageous for program operation. The memory control circuitry is configured to, in response to specification of the particular storage location, store the data in the particular storage location. In some example configurations the auxiliary memory control circuitry is configured to, in response to detecting that the stalled data is static data, transfer the stalled data from the network to the particular storage location. In this way the processing element ensures that, regardless as to whether the data is retrieved by the memory control circuitry or the auxiliary memory control circuitry, the static data is stored in the particular storage location.

In some example configurations there is provided a non-transitory computer-readable medium storing computer-readable code for fabrication of the data processing apparatus as described herein.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular embodiments will now be described with reference to the figures.

FIG. 1 schematically illustrates a data processing apparatus 10 arranged as a spatial architecture according to various examples of the present techniques. Spatial architectures can accelerate some applications by unrolling or unfolding the computations, which form the most time-consuming portion of program execution, in space rather than in time. Computations are unrolled in space by using a plurality of hardware units capable of concurrent operation. In addition to taking advantage of the concurrency opportunities offered by disaggregated applications which have been spread out on a chip, spatial architectures, such as data processing apparatus 10, also take advantage of distributed on-chip memories. In this way, each processing element is associated with one or more memory blocks in close proximity to it. As a result, spatial architectures can circumvent the von-Neumann bottleneck which hinders performance of many traditional architectures.

The data processing apparatus 10 comprises an array of processing elements which is connected to a cache hierarchy or main memory via interface nodes, which are otherwise referred to as interface tiles (ITs) and are connected to the network via multiplexers (X). Processing elements in the data processing apparatuses 10 according to the configurations described herein comprise two different types of circuitry. Each processing element comprises processing circuitry, otherwise referred to as compute tiles (CTs), and memory control circuitry, otherwise referred to as memory tiles (MTs). The role of the CTs is to perform the bulk of the data processing operations and arithmetic computations. The role of the MTs is to perform data accesses to locally connected memory (local storage circuitry) and data transfers to/from the more remote regions of memory and inter-processing element memory transfers between the processing element and other processing elements.

In some example configurations each of the processing elements of the data processing apparatus 10 comprises local storage circuitry connected to each memory control circuit (MT) and each memory control circuitry (MT) has direct connections to one processing circuit (CT). Each MT-CT cluster is connected to a network-on-chip which is used to transfer data between memory control circuits (MTs) and between each memory control circuit (MT) and the interface node (IT). In alternative configurations local storage circuitry is provided between plural processing elements and is accessible by multiple memory control circuits (MTs). The processing elements may be conventional processing elements. Alternatively, the processing elements may be triggered processing elements in which an instruction is executed when a respective trigger condition or trigger conditions is/are met.

The processing elements of the data processing apparatus 10 illustrated in FIG. 1 are each connected via a set of input and output channels to the network-on-chip which comprises switches, and data links between those switches forming a two-dimensional torus topological layout. Data can be routed around the network-on-chip using any algorithm. However, a particularly efficient routing algorithm is the xy routing algorithm modified to take the torus layout into account. The xy algorithm prevents routing deadlocks (cyclic dependence between processing elements and/or network resources which makes forward progress impossible) within the network by prohibiting data routed along the y direction from being subsequently routed along the x direction. Whilst the dimension ordered routing of the xy algorithm is known to result in the network itself being deadlock free, the potential for a deadlock still exists due to the interaction between the processing elements and the network.

In particular, where the processing elements are triggered processing elements it is possible that a deadlock can occur at the processing element—network interface as follows. The memory control circuitry (MT) issues a plurality of data requests to the network where each of the plurality of data requests is to a different interface channel. The requests are routed to the interface node (IT) which sends the request to memory. In the meantime the processing circuitry (CT) of the processing element carries out some other processing and eventually is unable to continue as it is waiting for a first requested data request of the plurality of data requests on the interface channel specified for the first requested data. The interface node (IT) receives the data associated with the memory requests and transmits them out of order onto the network. As a result, the first requested data ends up "stuck" behind the later requested data. The later requested data cannot be extracted from the network because the corresponding trigger conditions associated with that data are not met. As a result stalled data builds up in the network and the processing apparatus 10 stalls.

There are several potential solutions to this that each pose a number of challenges. In a first example solution the buffer capacity of interface channels between the network and the processing elements is increased. This approach delays the onset of a deadlock, but does not necessarily avoid it, in particular where the interface channels comprise first-in-first-out buffers. In a second example solution the interface node (IT) is modified to not perform any re-ordering of requests. However, this is not desirable as it removes the ability of the interface node to perform load balancing within the network and may result in higher network congestion within some parts of the network. In a third example solution the triggered processing elements switch states periodically to that each channel of the plurality of interface channels is checked periodically to ensure that there is no stalling. This adds significant complexity to the network and adds unnecessary delays. In a fourth example solution the data processing apparatus is configured to use virtual circuits enabling packets to overtake one another as they are routed around the network. However, this approach complicates the network design significantly increasing the amount of buffering required and the power consumption of the data processing apparatus. In a fifth example solution the processing elements are modified to communicate with the interface node (IT) to indicate readiness before the interface node (IT) can begin transmission. This approach requires additional synchronisation steps and potentially reduces performance because data transfers cannot be fully overlapped with computation by the processing elements.

Alternatively, in some configurations an "either" clause can be added to the triggered instruction specification allowing an instruction to be triggered if there is activity on any of the plurality of interface channels. This scenario is illustrated in FIG. 2 for a situation in which two channels are checked. Flow begins at step S10 where the memory checking circuitry (MT) determines whether there is activity on channel A or channel B. If there is activity on channel A then flow proceeds to step S12 where the memory control circuitry retrieves the data from channel A. Flow proceeds to step S14 where it is determined if all the data is retrieved from channel A. Flow then proceeds to step S16 where is determined if all the data has been read. If yes then flow proceeds to step S24 where it is determined that the loading of data from channels A and B is complete. Alternatively, if at step S16 it is determined that not all the data is read, flow returns to step S10. If at step S10 it is determined that there is activity on channel B then flow proceeds to step S18 where the memory control circuitry retrieves the data from channel B. Flow then proceeds to step S20 where it is determined if all the data is retrieved from channel B. Flow then proceeds to step S22 where it is determined if all the data has been read. If yes then flow proceeds to step S24 where it is determined that the loading of data from channels A and B is complete. Alternatively, if at step S22 it is determined that not all the data is read, then flow returns to step S10. In this way the memory control circuitry (MT) can monitor plural channels for an item of requested data and, hence, can avoid stalls in relation to data on specific channels. However, this approach increases the complexity of the instruction issuing circuitry within memory control circuitry (MT). This complexity is further increased if the "check" state illustrated in FIG. 2 is not a binary check option.

In order to overcome the potential disadvantages associated with the above solutions the inventors have used the observation that data associated with network traffic in spatial architectures tends to be "bursty" in typical workloads of spatial architectures. This is illustrated in FIG. 3 which shows how the interface channel occupancy of several processing elements varies over time. The plot shows data taken from a memory control circuitry of processing elements at coordinates (7,0), (3,2) and (4,4) within a spatial architecture comprising an 8 by 8 two-dimensional array of processing elements. The data is from an execution of the GEMM benchmark and the bursts represent the start of an epoch within the calculation where a number of data sets are transferred from the interface node (IT) to the memory control circuitry (MTs). Hence, whilst the inability to handle certain peaks can lead to deadlocks, simply adding substantial amounts of buffering within the network itself to deal with the bursts will lead to an overprovisioned design because the buffers will be underutilised for the majority of the time.

In contrast to the above solutions, FIG. 4 schematically illustrates details of a data processing apparatus 100 according to various examples of the present techniques. Data processing apparatus 100 is arranged and comprises a plurality of processing elements 102 arranged in a spatial architecture on a single chip and connected to one another via a network 108. Each processing element 102, exemplified through processing element 102(A), comprises processing circuitry 114 to perform processing operations, memory control circuitry 104 to perform data transfer operations associated with the processing element 102(A) and to issue data transfer requests for requested data to the network 108. The memory control circuitry 104 is also configured to monitor the network 108 for the requested data and, in response to detecting the requested data, to retrieve the requested data from the network. The data processing apparatus 100 further comprises local storage circuitry 110 comprising a plurality of local storage sectors 122(A), 112(B) and 112(C) to store data associated with the processing operations. The data processing apparatus 100 further comprises auxiliary memory control circuitry 106 configured to monitor the network 108 to detect stalled data associated with the processing element 102(A) and, in response to detecting the stalled data, to transfer the stalled data from the network to an auxiliary storage buffer dynamically selected from amongst the plurality of local storage sectors 112. It would be readily apparent to the person of ordinary skill in the art that, whilst three processing elements 102 are illustrated, the spatial architecture can comprise any number of processing elements 102. Furthermore, the local storage circuitry 110 can comprise any number of local storage sectors 112.

FIG. 5 schematically illustrates further details of a processing element according to various examples of the present techniques. Data processing apparatus 20 comprises a spatial architecture implemented on a single chip. The spatial architecture comprises a plurality of processing elements 22(A)-22(I) each including network switches or routers to connect the associated processing element to neighbouring network switches or routers. Each of the plurality of processing elements comprises processing circuitry 26 to perform processing operations, memory control circuitry 24 to request data and to retrieve data from the network, local storage comprising a plurality of local storage sectors 34(A)-34(D), auxiliary memory control circuitry to monitor the network to detect stalled data associated with the processing element, interface channels comprising input channels 42 connected to the network through multiplexor 40 and (optionally) First-In-First-Out (FIFO) queue 52 and output channels 38 connected to the network through multiplexor 36 and (optionally) FIFO queue 54. The auxiliary memory control circuitry 28 comprises auxiliary table storage 30 to store an auxiliary memory table associating data request tags of requested data and a corresponding location in the local storage sectors 34. The local storage circuitry further comprises a plurality of counters 32(A) to 32(D). Each of the plurality of counters 32 is indicative of a number of recent accesses, by the memory control circuitry 24, to the corresponding local storage sectors 34. In the illustrated example the local storage circuitry comprises four local storage sectors 34(A) to 34(D). The counter 32(A) indicates a number of recent accesses, by the memory control circuitry 24, to the local storage sector 34(A). The counter 32(B) indicates a number of recent accesses, by the memory control circuitry 24, to the local storage sector 34(B). The counter 32(C) indicates a number of recent accesses, by the memory control circuitry 24, to the local storage sector 34(C). The counter 32(D) indicates a number of recent accesses, by the memory control circuitry 24, to the local storage sector 34(D).

The processing elements 22 (including the network switches or routers) are arranged to form a two-dimensional array, which in some configurations may be arranged in a two-dimensional torus layout. The processing elements 22 are connected, via a multiplexer 46 to an interface node 56. The interface node 56 comprises a request queue 44 and a transfer reorder unit 48. Requests for data from the memory control circuitry 24 are output via the output channels 38, through the multiplexer 36, FIFO 54, the network, multiplexer 46 and to the interface node 56. Requests are queued in request queue 44 and may be reordered by transfer reorder unit 48 before being transmitted form the interface node 56 to storage 50. Data from the storage 50 is returned, via the interface node 56 to the multiplexer 46 for distribution into the network. The requested data for a particular processing element is identified based on a data tag and is transferred, via the FIFO 52 and the multiplexer 40 to one of the input channels 42.

The memory control circuitry 24 monitors the input channels 42 and, in response to detecting requested data and the appropriate trigger conditions being met, transfers the data from the input channels 42. The auxiliary memory control circuitry 28 monitors the input channels 42 for stalled data. In some configurations the auxiliary memory control circuitry 28 compares snapshots of data in each input channel 42 at different times to determine whether the input channels 42 contain stalled data. In other configurations the auxiliary memory control circuitry 28 monitors a dequeue signal that is modified by the memory control circuitry 24 in response to data being retrieved from the input channels 42. When stalled data is detected the auxiliary memory control circuitry 28 retrieves the stalled data from the input channels, asserts the dequeue signal, and stores the data in an auxiliary storage buffer. The auxiliary storage buffer is one or more local storage sectors 34 that are selected by the auxiliary memory control circuitry 30, for example, due to being infrequently accessed by the memory control circuitry. When the auxiliary memory control circuitry 28 retrieves data from the input channels 42 to the auxiliary storage buffer, the auxiliary memory control circuitry 28 adds an entry to the auxiliary memory table stored in the auxiliary table storage 30 to associate a location in the local storage sectors 34 with a data request tag corresponding to the requested data. Hence, the auxiliary memory control circuitry 28 provides a compact solution to deal with high volumes of data on the input channels 42 which may be provided out of order by the interface node 56, for example, the data "bursts" observed in FIG. 3.

When monitoring the input channels 42 for requested data, the memory control circuitry 24 transmits a signal to the auxiliary memory control circuitry 28 to perform a lookup in the auxiliary memory table, stored in the auxiliary table storage 30, to determine whether the requested data has been transferred to the auxiliary storage buffer. If the lookup in the auxiliary memory table hits then the location corresponding to the requested data in the local storage sectors 34 is returned to the memory control circuitry 24 which can then retrieve the data from the location in the local storage sectors 34. If the lookup in the auxiliary memory table misses then the miss is indicated, by the auxiliary memory control circuitry 28, to the memory control circuitry 24 which continues to monitor the input channels 42 for the requested data.

The auxiliary memory control circuitry 28 determines the local storage sector 34 of the local storage based on the plurality of counters 32. The counters 32 indicate a number of recent accesses by the memory control circuitry 24. In some configurations the counters 32 are reset to a default value (for example zero) after a predetermined time. When a local storage sector 34 is accessed by the memory control circuitry 24 the counter 32 corresponding to the local storage sector is modified to indicate the access (for example the counter is incremented). In this way each counter 32 represents a number of accesses, by the memory control circuitry 24 to a corresponding local storage sector 34. The auxiliary memory control circuitry 28 is therefore able to determine which storage sector 34 of the plurality of local storage sectors 34 has been least used since the last time the plurality of counters 32 were reset. In some configurations the memory control circuitry is configured to determine a next location for the auxiliary storage buffer based on a current set of counter values 32 and to then reset (or decrement) the counter values 32. In alternative configurations counters 32 are upper and lower saturating counters and the storage circuitry increments a counter 32 associated with an accessed local storage sector 34 and decrements all counters that are associated with different local storage sectors 34. In this way a global picture of the most recently accessed storage sectors can be maintained.

The memory control circuitry 24 and the auxiliary memory control circuitry 28 are each configured to respect particular requirements of a data request issued by the memory control circuitry. In particular, the memory control circuitry 24 and the auxiliary memory control circuitry 28 are configured to, where the request indicates that the requested data is to be stored in a particular location of the local storage circuitry, retrieve the requested data to the particular location of the local storage circuitry independent as to whether the particular location of the local storage circuitry is in the local storage sector 34 that is currently used as the auxiliary storage buffer. The local storage circuitry is further configured to arbitrate requests from the memory control circuitry 24 and the auxiliary memory control circuitry 28 and to prioritise accesses from the auxiliary memory control circuitry 28 where there is a conflict.

FIG. 6 schematically illustrates a sequence of steps taken by memory control circuitry 24 according to various examples of the present techniques. At step S50 the memory control circuitry 24 issues a data transfer request to the network. The data transfer request may be a request for data from storage circuitry 50 or from a different processing element 22. Flow then proceeds to step S52 where the memory control circuitry 24 monitors the network for the requested data. The memory control circuitry 24 may perform this monitoring in response to issuing the data transfer request or in response to a trigger condition associated with the data transfer request being satisfied. Flow then proceeds to step S54 where it is determined whether the requested data is detected on the input channels 42. If the data is not detected then flow returns to step S52. Alternatively, if the data is detected on the input channels 42 then flow proceeds to step S56 where the data is requested retrieved from the network.

FIG. 7 schematically illustrates a sequence of steps taken by auxiliary memory control circuitry 28 according to various examples of the present techniques. Flow begins at step S60 where the auxiliary memory control circuitry 28 monitors the network (input channels 42) to detect stalled data. Flow then proceeds to step S62 where it is determined whether stalled data has been detected. If no then flow returns to step S60. Alternatively, if at step S62 it was determined that stalled data has been detected in the network (input channels 42) then flow proceeds to step S64 where the auxiliary storage buffer is dynamically selected from the plurality of local storage sectors 34 based on a usage metric of each storage sector (for example using counters 32). Flow then proceeds to step S66 where the stalled data is transferred from the network (input channels 42) to the auxiliary storage buffer.

FIG. 8 schematically illustrates further details of steps taken by the auxiliary memory control circuitry 28 in order to detect stalled data according to various examples of the present techniques. Flow begins at step S70 where the auxiliary memory control circuitry 28 captures first queue data indicative of data temporarily stored in the input channels 42. The first queue data may be indicative of all data that is stored in the input channels 42. Alternatively, the first queue data may only represent data at the front of each of the input channels 42. The first queue data may indicate data tags and any attributes of the requested data. Flow then proceeds to step S72 where the auxiliary memory control circuitry 28 waits for a predetermined period. Flow then proceeds to step S74 where the auxiliary memory control circuitry 28 captures second queue data indicative of data temporarily stored in the input channels 42. The second queue data may be indicative of all data that is stored in the input channels 42. Alternatively, the second queue data may only represent data at the front of each of the input channels 42. The second queue data may indicate data tags and any attributes of the requested data. Flow then proceeds to step S76 where it is determined whether the first queue data is equal to the second queue data. This determination involves determining if the data present in the first queue data is all still present in the queue, i.e., the queued data may be stalled data. If the first queue data is not all present within the second queue data then it is determined that data items have been removed from the input channels 42 during the predetermined period and flow proceeds to step S84 where the first queue data is modified to correspond to the second queue data and flow returns to step S72. Alternatively, if at step S76 it was determined that the first queue data and the second queue data indicate that there is stalled data present in the input channels 42 then flow proceeds to step S78. At step S78 it is determined whether the first queue data contains requested data items that specify a specific region of local storage. If yes then flow proceeds to step S80 where the data indicated by the first queue data is transferred (retrieved) from the input channels 42 to the local storage sector 34 specified in the first queue data. Flow then proceeds to step S82. Alternatively, if at step S78 it was determined that the first queue data doesn't specify a particular region of local storage then flow proceeds to step S86 where a local storage sector 34 is selected, for use as the auxiliary storage buffer, based on a lowest counter value 32 associated with the local storage sector 34. Flow then proceeds to step S88 where the first queued data is transferred to the auxiliary storage buffer. Flow then proceeds to step S82 where one or more entries are created in the auxiliary memory table stored in the auxiliary table storage 30. Flow then returns to step S70.

FIG. 9 schematically illustrates a sequence of steps taken by auxiliary memory control circuitry 28 in response to a data transfer request according to various examples of the present techniques. Flow begins at step S90 where the memory control circuitry issues a request to monitor the input channels 42 to determine whether requested data is present in the input channels. The auxiliary memory control circuitry 28 intercepts this request and, at step S92, performs a lookup in the auxiliary memory table. Flow then proceeds to step S94 where it is determined whether the lookup hits in the auxiliary memory table. If the lookup does not hit then flow proceeds to step S100 where the memory control circuitry monitors the input channels 42 for the requested data. Alternatively, if at step S94 it was determined that the lookup has hit in the auxiliary memory table then flow proceeds to step S96 where the location associated with the monitored data is returned to the memory control circuitry 24. Flow then proceeds to step S98 where the request, from the memory control circuitry 24, to monitor the input channels 42 is suppressed. Flow then returns to step S90.

FIG. 10 schematically illustrates a sequence of steps taken by local storage circuitry according to various examples of the present techniques. Flow begins at step S110 where each of the counters 32 are set to zero. Flow then proceeds to step S112 where it is determined if a local storage sector has been accessed. If no then flow remains at step S112. Alternatively, if at step S112 it is determined that a local storage sector has been accessed, for example local storage sector S34(B), then flow proceeds to step S114 where the counter associated with the accessed local storage sector is incremented by a first amount, in this case counter 32(B). Flow then proceeds to step S116 where the counters 32 that are not associated with the accessed local storage sector 34 are decremented by a second amount. In the case of the example, counters 32(A), 32(C) and 32(D) are decremented by the second amount. Flow then returns to step S112. In this way the counters 32 of the local storage circuitry represent an indication of which local storage sector 34 has been accessed the most frequently during a recent period of accesses by the memory control circuitry 24.

In brief overall summary there is provided a data processing apparatus and method. The data processing apparatus comprises a plurality of processing elements connected via a network arranged on a single chip to form a spatial architecture. Each processing element comprising processing circuitry to perform processing operations and memory control circuitry to perform data transfer operations and to issue data transfer requests for requested data to the network. The memory control circuitry is configured to monitor the network to retrieve the requested data from the network. Each processing element is further provided with local storage circuitry comprising a plurality of local storage sectors to store data associated with the processing operations, and auxiliary memory control circuitry to monitor the network to detect stalled data. The auxiliary memory control circuitry is configured to transfer the stalled data from the network to an auxiliary storage buffer dynamically selected from amongst the plurality of local storage sectors.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising a plurality of processing elements connected via a network arranged on a single chip to form a spatial architecture, each processing element of the plurality of processing elements comprising:
processing circuitry to perform processing operations;
memory control circuitry to perform data transfer operations associated with the processing element and to issue data transfer requests for requested data to the network, wherein the memory control circuitry is configured to monitor the network for the requested data and, in response to detecting the requested data, to retrieve the requested data from the network;
local storage circuitry to store data associated with the processing operations, the local storage circuitry comprising a plurality of local storage sectors; and
auxiliary memory control circuitry configured to monitor the network to detect stalled data associated with the processing element and, in response to detecting the stalled data, to transfer the stalled data from the network to an auxiliary storage buffer dynamically selected from amongst the plurality of local storage sectors.

2. The data processing apparatus of claim 1, wherein:
the processing operations and the data transfer operations are triggered operations;
each triggered operation is performed in response to trigger data meeting a corresponding processing trigger condition, and
the processing element is configured to set further trigger data in response to completion of the triggered operation.

3. The data processing apparatus of claim 1, wherein:
each data transfer request specifies a data request tag; and
the auxiliary memory control circuitry comprises auxiliary table storage to store an auxiliary memory table associating a corresponding data request tag of the stalled data and a corresponding location in the auxiliary storage buffer.

4. The data processing apparatus of claim 3, wherein the auxiliary memory control circuitry is configured to perform, in response to an indication that the memory control circuitry requires the stalled data, a lookup in the auxiliary memory table based on the data request tag specified by the data transfer request.

5. The data processing apparatus of claim 4, wherein:
the auxiliary memory control circuitry is configured to, when the lookup hits in the auxiliary memory table, provide a location associated with the data request tag to the memory control circuitry; and
the memory control circuitry is configured to retrieve the stalled data from the location.

6. The data processing apparatus of claim 1, wherein auxiliary memory control circuitry is configured to select the auxiliary storage buffer dynamically from amongst the plurality of local storage sectors based on a usage metric of each of the local storage sectors by the memory control circuitry.

7. The data processing apparatus of claim 6, wherein:
each processing element further comprises a plurality of counters defining the usage metric, each counter indicative of a number of times an associated local storage sector has been accessed by the memory control circuitry; and
the auxiliary memory control circuitry is configured to select, as the auxiliary storage buffer, a particular local storage sector corresponding to a counter of the plurality of counters indicating fewest accesses.

8. The data processing apparatus of claim 7, wherein the local storage is configured to allow the memory control circuitry and the auxiliary memory control circuitry to access different sectors in parallel.

9. The data processing apparatus of claim 8, wherein the local storage circuitry is configured to, in response to parallel accesses to a same sector by the memory control circuitry and the auxiliary control circuitry, prioritize the auxiliary memory control circuitry.

10. The data processing apparatus of claim 1, wherein:
the memory control circuitry is configured to, when retrieving the data from the network, modify a dequeue signal to indicate that the data has been removed from the network; and
the auxiliary memory control circuitry is configured to, when monitoring the network to detect the stalled data:
periodically monitor the dequeue signal; and
determine that the queued data comprises stalled data when the dequeue signal indicates that the data remains on the network.

11. The data processing apparatus of claim 1, wherein:
each processing element further comprises a plurality of interface channels to store queued data to be transferred between the processing element and the network; and the memory control circuitry is configured to monitor the network for the requested data by monitoring the plurality of interface channels.

12. The data processing apparatus of claim 11, wherein the auxiliary memory control circuitry is configured to, when monitoring the network to detect stalled data:
   capture first queue data indicative of the queued data in the plurality of interface channels at the start of a predetermined time period;
   capture second queue data indicative of the queued data in the plurality of interface channels at the end of the predetermined time period; and
   determine that the queued data comprises stalled data when the first queue data is the same as the second queue data.

13. The data processing apparatus of claim 1, wherein the spatial architecture comprises the plurality of processing elements connected to form a multi-dimensional array.

14. The data processing apparatus of claim 13, wherein:
   the data processing apparatus is configured to arrange processing elements of the plurality of processing elements into subgroups; and
   the data processing apparatus further comprises a multiplexer configured to route memory requests to the subgroup containing the processing element.

15. The data processing apparatus of claim 1, wherein the data transfer request is one of:
   an inter-processing element data transfer request specifying data to be transferred from another processing element; and
   a memory request specifying data to be transferred from a memory location in main memory.

16. The data processing apparatus of claim 1, wherein the plurality of processing elements are connected to global storage via a common interface node.

17. The data processing apparatus of claim 1, wherein the data transfer request specifies that the returned data is static data to be stored in a particular storage location.

18. The data processing apparatus of claim 17, wherein the auxiliary memory control circuitry is configured to, in response to detecting that the stalled data is static data, transfer the stalled data from the network to the particular storage location.

19. A non-transitory computer-readable medium storing computer-readable code for fabrication of the data processing apparatus of claim 1.

20. A method of operating a data processing apparatus comprising a plurality of processing elements connected via a network arranged on a single chip to form a spatial architecture, each processing element comprising processing circuitry, memory control circuitry, local storage circuitry comprising a plurality of local storage sectors and auxiliary memory control circuitry, the method comprising:
   performing processing operations using the processing circuitry;
   storing data associated with the processing operations;
   with the memory control circuitry, performing data transfer operations associated with the processing element, issuing data transfer requests for requested data to the network, monitoring the network for the requested data and, in response to detecting the requested data in one of the plurality of interface channels, retrieving the requested data from the network; and
   with the auxiliary memory control circuitry monitoring the network to detect stalled data associated with the processing element and, in response to detecting the stalled data, transferring the stalled data from the network to an auxiliary storage buffer dynamically selected from amongst the plurality of local storage sectors.

* * * * *